US008045225B2

(12) United States Patent
Ooya et al.

(10) Patent No.: US 8,045,225 B2
(45) Date of Patent: Oct. 25, 2011

(54) IMAGE FORMING APPARATUS, INFORMATION PROCESSING APPARATUS, INFORMATION PROCESSING METHOD, AND COMPUTER-READABLE STORAGE MEDIUM

(75) Inventors: Hiroshi Ooya, Machida (JP); Atsushi Ikeda, Tokorozawa (JP); Toshiaki Shirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 331 days.

(21) Appl. No.: 12/368,744

(22) Filed: Feb. 10, 2009

(65) Prior Publication Data

US 2009/0201521 A1 Aug. 13, 2009

(30) Foreign Application Priority Data

Feb. 13, 2008 (JP) ................................ 2008-032270

(51) Int. Cl.
*G06F 15/00* (2006.01)
*G03G 15/00* (2006.01)
*G03G 15/01* (2006.01)

(52) U.S. Cl. ......... 358/1.9; 358/504; 358/474; 358/500; 399/301

(58) Field of Classification Search .................. 358/1.9, 358/1.12, 3.26, 474, 500, 504, 505, 518, 358/527, 536, 540; 382/162, 167; 399/301; 348/263
See application file for complete search history.

(56) References Cited

U.S. PATENT DOCUMENTS 5,764,386 A * 6/1998 Robinson ...................... 358/504
2003/0174364 A1* 9/2003 Goto ............................. 358/504
2007/0110461 A1* 5/2007 Yoshida .......................... 399/44
2009/0213399 A1* 8/2009 Ikeda ............................ 358/1.9
2010/0020367 A1* 1/2010 Abe et al. ...................... 358/474

FOREIGN PATENT DOCUMENTS

JP H05-083485 A 4/1993
JP 3202709 B2 8/2001

* cited by examiner

*Primary Examiner* — Kimberly A Williams
(74) *Attorney, Agent, or Firm* — Canon U.S.A., Inc. I.P. Division

(57) ABSTRACT

An image forming apparatus includes a data recording unit to store a misregistration amount of a scanning line from an ideal scanning line when a plurality of laser beams is scanned in a main scanning direction, a calculation unit to calculate a shape of the scanning line based on the misregistration amount stored, and to determine a scanning line curvature cancellation curve which cancels misregistration of the calculated shape of the scanning line, and an image forming unit to form an image that reflects the scanning line curvature cancellation curve by shifting image data which is read out from a memory unit in a sub scanning direction according to the scanning line curvature cancellation curve. The image forming unit corrects the amount of misregistration which is smaller than a main scanning line interval by adjusting a transfer point at which the image data is shifted in the sub scanning direction.

5 Claims, 8 Drawing Sheets

IMAGE FORMING APPARATUS, INFORMATION PROCESSING APPARATUS, INFORMATION PROCESSING METHOD, AND COMPUTER-READABLE STORAGE MEDIUM

BACKGROUND OF THE INVENTION

1. Field of the Invention

The present invention relates to an image forming apparatus capable of forming an image by using a plurality of laser beams, an information processing apparatus capable of communicating with the image forming apparatus, an information processing method, and a computer-readable storage medium.

2. Description of the Related Art

Conventionally, an image forming apparatus which forms an image by scanning and exposing a photosensitive member, which is provided as an image bearing member, to a laser beam, such as a laser printer and a laser copier, is known. In recent years, digital and color image forming apparatuses have become popular.

In forming a color image by using such image forming apparatuses, an original image corresponding to each of four colors (i.e., cyan (C), magenta (M), yellow (Y), and black (K)) is sequentially formed. Ultimately, the four original images are superimposed to form one color image. However, productivity of an image-forming operation of these types of image forming apparatuses is lower than a conventional image forming apparatus for forming black-and-white images.

As a solution to this problem, a tandem-type image forming apparatus is conventionally used. The tandem-type image forming apparatus can simultaneously form an original image corresponding to each of the C, M, Y, and K colors, and includes a plurality of photosensitive members. The photosensitive member corresponding to each of the four colors is exposed to a laser beam which is emitted from an exposure unit according to an image data signal separated into each of the four colors. Then the image formed on each of the photosensitive members is developed, and an original image for each of the four colors will be formed. Finally, by superimposing the original image of each of the four colors on a same transfer medium, a color image is formed on the transfer medium. In this way, productivity of the tandem-type image forming apparatus concerning the image forming operation is significantly increased.

Next, an example of a configuration of a scanning exposure unit that emits laser beams to scan and expose each of the photosensitive members will be described. The scanning exposure unit is included in the above-described tandem-type image forming apparatus.

FIG. 1 illustrates an image forming apparatus 100 including scanning exposure units 102C, 102M, 102Y, and 102K each of which deflects a laser beam emitted from a laser light source 103 using a polygonal mirror 104. The scanning exposure units 102C, 102M, 102Y, and 102K respectively corresponds to the four colors C, M, Y, and K and are arranged independently. In the image forming apparatus 100, each of the scanning exposure units 102C, 102M, 102Y, and 102K includes the polygonal mirror 104 which is driven by a motor (not shown). The polygonal mirror 104 deflects the laser beam and scans a corresponding photosensitive member 105 to expose a monochromatic image of each of the C, M, Y, and K colors thereon.

The monochromatic image which is exposed on the photosensitive member 105 corresponding to each of the four colors is developed by a respective developer 106, and then transferred onto a respective transfer unit 107 by a transfer belt 108. The transfer belt 108 is a transfer member common to the four colors. A fixing unit 109 is provided on the most rear-end side of the transfer belt 108. At the fixing unit 109, the monochromatic image of each of the four colors is sequentially superimposed on a recording medium 101, and one color image is formed thereby.

However, in the tandem-type image forming apparatus, positional misregistration due to, for example, variation of optical characteristic of the laser beam of each of the four colors emitted from the respective scanning exposure units may occur when the monochromatic image of each color is superimposed. Such positional misregistration may deteriorate a quality of the formed image. Thus, it is necessary to perform appropriate position adjustment control of each monochromatic image. Japanese Patent Application Laid-Open No. 05-083485 discusses a method for appropriately adjusting a position of monochromatic images, which can reduce color misregistration of each monochromatic image in a sub scanning direction to half a main scanning line interval or smaller.

When appropriate position adjustment is performed for original images to form a high-quality color image, it is necessary to appropriately set a predetermined parameter. Typical parameters that need to be set are as follows:

A write start position of a scanning line in a main scanning direction (hereinafter referred to as a "left registration")

A write start position of a scanning line in a sub scanning direction (hereinafter simply referred to as a "scanning line write start position")

A write end position or a print width of a scanning line in the main scanning direction (hereinafter referred to as "magnification")

Curvature of a scanning line (hereinafter referred to as a "scanning line curvature")

An inclination of a scanning line (hereinafter referred to as a "scanning line inclination")

Next, position adjustment control of each monochromatic image performed in the tandem-type image forming apparatus will be described.

When a position of each monochromatic image is adjusted, it is necessary to correct the above described left registration, scanning line write start position, magnification, scanning line curvature, and scanning line inclination, and set appropriate values for them. Here, the correction of the scanning line curvature will be described as an example.

The scanning line curvature is related to an optical system of the scanning exposure unit. For example, the scanning line curvature occurs when an incident angle of the light incident on the polygonal mirror mounted on a polygonal mirror drive motor is not 90-degrees with respect to a reflection surface of the polygonal mirror. The polygonal mirror is a deflection unit of a scanning optical system in the scanning exposure unit. The scanning line curvature occurs since an optical path length to the polygonal mirror is changed depending on a rotation angle of the polygonal mirror at the time of scanning with the laser beam. When the optical path length is changed, a reflection position of the light on the reflection surface is also changed.

In a case of a plane mirror that simply reflects light on its reflection surface, the scanning line curvature may occur if the reflection surface is curved in the scanning direction since the optical path length is changed as is with the case described above. Since the scanning line curvature occurs due to an alignment of the optical system, as described above, the scanning line curvature occurs constantly. If a scanning line curvature is generated in a color printer that forms a full-color image by superimposing images formed by scanning lines of each color, color misregistration will be generated and a high-quality color image cannot be formed.

As a method for correcting the scanning line curvature, there is a conventional method, which corrects the scanning line on the photosensitive member by mechanically deforming the plane mirror of the scanning exposure unit and changing a curve of the scanning line opposite to the curvature of the scanning line. A scanning line of a scanning exposure unit using a cylindrical mirror can be corrected by deforming the cylindrical mirror, as well as the plane mirror.

There are methods to electrically correct the scanning line curvature. One of such methods discussed in Japanese patent No. 3202709 changes writing timing of image data depending on a scanning line curvature. Another method corrects the scanning line curvature by corresponding image data to be printed to the scanning line curvature and changing arrangement of the image data per pixel in advance on image memory. Additionally, there is a method to minimize the scanning line curvature by changing a light quantity of the laser so as to form, on the photosensitive member, a latent image whose pixel position is intentionally moved in the sub scanning direction.

When the position of each monochromatic image is adjusted, the above described left registration, scanning line write start position, magnification, scanning line curvature, and scanning line inclination are corrected and set to appropriate values.

However, the write start position of the scanning line in the sub scanning direction can be corrected only in units of one line in the sub scanning direction according to characteristics of the image forming apparatus that uses laser. One line is an interval of the main scanning lines. Thus, the positional misregistration of each color image may be up to half the interval of the main scanning lines in the sub scanning direction. Thus, as illustrated in FIG. 2, as to an amount of color misregistration between two colors, misregistration of up to one line in the sub scanning direction may occur.

If the color misregistration of the monochromatic images is as large as one line, a true color cannot be realized and the color image becomes low in quality.

SUMMARY OF THE INVENTION

The present invention is directed to an image forming apparatus which is capable of forming a high-quality image by correcting a substantial write start position of image data in a sub scanning direction in units of interval smaller than a main scanning line interval, an information processing apparatus, an information processing method, and a computer-readable storage medium.

According to an aspect of the present invention, an image forming apparatus includes a data recording unit configured to store an amount of misregistration of a scanning line with respect to an ideal scanning line when a plurality of laser beams is scanned in a main scanning direction, a calculation unit configured to calculate a shape of the scanning line when the plurality of laser beams is scanned in the main scanning direction based on the amount of misregistration stored in the data recording unit, and to determine a scanning line curvature cancellation curve which cancels misregistration of the calculated shape of the scanning line, and an image forming unit configured to form an image that reflects the scanning line curvature cancellation curve by shifting image data which is read out from a memory unit in a sub scanning direction according to the scanning line curvature cancellation curve determined by the calculation unit. The image forming unit corrects the amount of misregistration which is smaller than a main scanning line interval by adjusting a transfer point at which the image data is shifted in the sub scanning direction.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

An image processing system to which the present invention can be applied will be described referring to FIG. 3.

Figure 3:
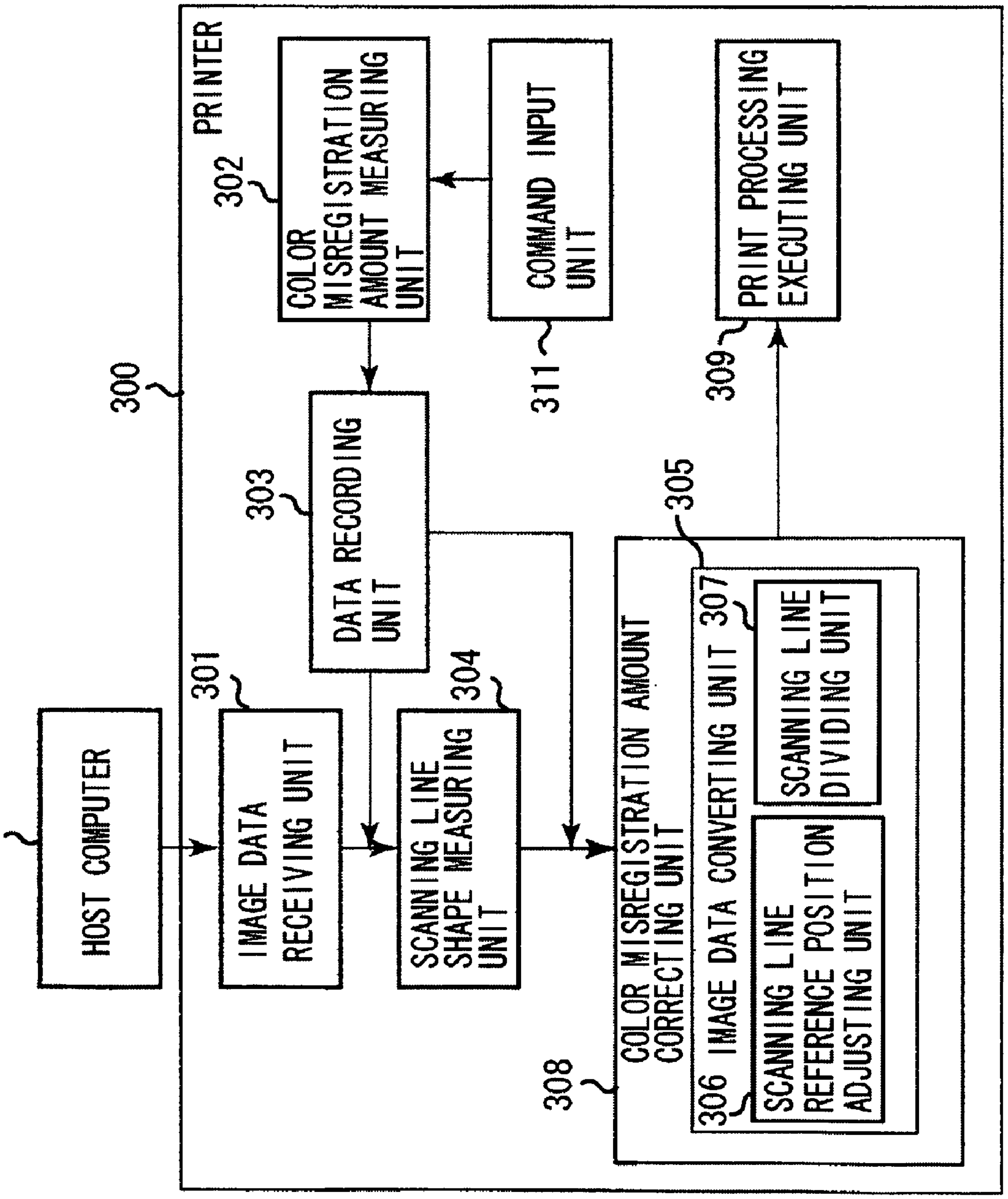
FIG. 3 is a block diagram illustrating an overall configuration of an image processing system to which the present invention can be applied.

FIG. 3 is a block diagram illustrating an overall configuration of an image processing system to which an information processing apparatus according to a first exemplary embodiment of the present invention can be applied.

In the present exemplary embodiment, a printer (especially, a laser beam printer) is taken as an example of the image forming apparatus. However, an ink jet printer or a multifunction peripheral having a print function can be used as the image forming apparatus according to the present invention and therefore the image forming apparatus is not limited to a specific type.

Further, in the present exemplary embodiment, a single image forming apparatus includes all units necessary for realizing the present invention. However, the units for realizing the present invention may not necessarily be included in a single image forming apparatus and, for example, a unit that is executable on a host computer (PC) side can be included in the PC as a driver.

In FIG. 3, when printing is instructed by an application program installed in a host computer 310, image data generated by a printer driver (not shown) is sent to a printer 300.

An image data receiving unit 301 receives the image data sent from the host computer 310 to the printer 300.

A color misregistration amount measuring unit 302 can measure an amount of color misregistration between two colors (e.g., black and magenta, black and cyan, and cyan and magenta) in both a main scanning direction and a sub scanning direction and an amount of misregistration of each scanning line from its ideal position (reference position).

A data recording unit 303 includes a hard disk or a non-volatile random access memory (NVRAM). Data of the amount of color misregistration between two colors and amount of misregistration of each scanning line from its ideal position (reference position) measured by the color misregistration amount measuring unit 302 is recorded in the data recording unit 303. The amount of misregistration of each scanning line from its ideal position is referred to as an amount of misregistration of each color.

A scanning line shape measurement unit 304 acquires an amount of curvature of the whole scanning line, namely a shape of the scanning line based on the amount of misregistration of the scanning line from its ideal position, which is measured by the color misregistration amount measuring unit 302. Further, the scanning line shape measurement unit 304 acquires a curved line which has a curve and an inclination that can cancel the shape of the measured scanning line (hereinafter referred to as a scanning line curvature cancellation curve).

An image data converting unit 305 includes a scanning line reference position adjusting unit 306 and a scanning line dividing unit 307. The image data converting unit 305 reflects the shape of the scanning line curvature cancellation curve acquired by the scanning line shape measurement unit 304 to the image data. By reflecting the shape of the scanning line curvature cancellation curve to the image data in the image data converting unit 305, a line which is curved if it is output normally can be output as a straight line. The scanning line reference position adjusting unit 306 and the scanning line dividing unit 307 are necessary for reflecting the shape of the scanning line curvature cancellation curve to the image data.

The scanning line dividing unit 307 acquires positions of end points of a plurality of straight lines that approximate the scanning line curvature cancellation curve acquired by the scanning line shape measurement unit 304 and are located in positions by an integral multiple of a main scanning line interval from the reference position that indicates the ideal position of a main scanning line. Each of the end points of the plurality of straight lines is called a transfer point, which will be described below. The scanning line reference position adjusting unit 306 changes the reference position to minimize the amount of misregistration of each color after correction when the scanning line dividing unit 307 acquires the transfer point. The correction is performed depending on the amount of misregistration of each color measured by the color misregistration amount measuring unit 302.

A color misregistration amount correcting unit 308 corrects the color misregistration by using the amount of color misregistration between two colors and the amount of misregistration of each color which are measured by the color misregistration amount measuring unit 302 and stored in the data recording unit 303. In addition to a conventionally-known color misregistration correction function, the color misregistration amount correcting unit 308 can correct color misregistration by a process performed by the image data converting unit 305 which is described below in detail.

A print processing executing unit 309 performs printing of the data which is a result of the correction performed by the color misregistration amount correcting unit 308 with respect to the image data generated by the image data converting unit 305.

A command input unit 311 is a user interface, such as a touch panel for a user to make various inputs.

Next, an example of a schematic configuration of the laser beam printer will be described.

Figure 4:
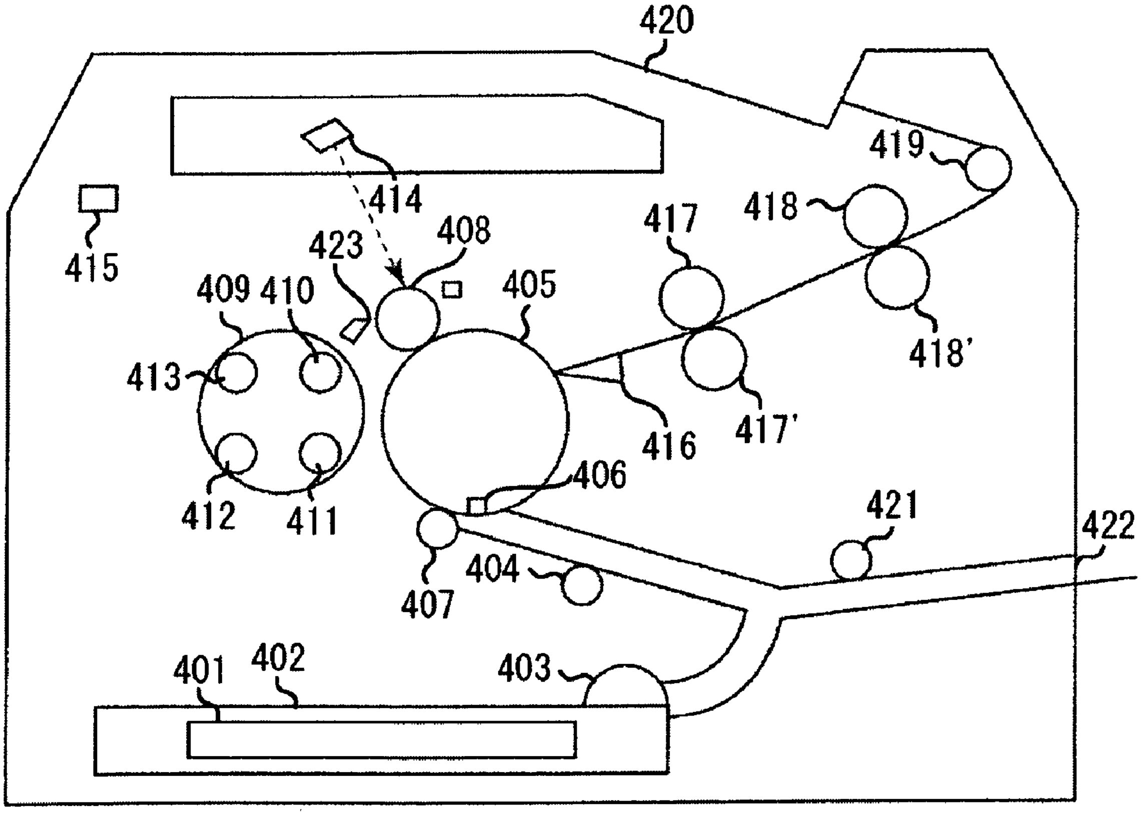
FIG. 4 is a cross section diagram illustrating a schematic structure of a laser beam printer to which the present invention can be applied.

FIG. 4 is a cross section diagram illustrating a schematic structure of the laser beam printer. In FIG. 4, paper 401 is a recording medium. A paper cassette 402 retains the paper 401. A paper feed clutch 403 of the cassette can separate a top sheet of the paper 401 set in the paper cassette 402. The paper feed clutch 403 has a cam shape and is rotated by a drive unit (not shown) each time the paper is fed. According to this rotation, the top sheet of the paper 401 is separated and a leading edge thereof is conveyed to a position of a paper feeding roller 404. One sheet of paper is fed when the paper feed clutch 403 makes one rotation. When the paper 401 is conveyed to the paper feeding roller 404 by the paper feed clutch 403, the paper feeding roller 404 rotates while lightly pressing the paper 401 and conveys the paper 401.

The laser beam printer includes a paper base 422 and a manual feed clutch 421 and thus enables manually feeding of one sheet of paper at a time from the paper base 422 in addition to the paper feeding from the paper cassette 402.

A transfer drum 405, a gripper 406 for gripping the leading edge of the paper, and a conveyance roller 407 are also arranged in the laser beam printer. The transfer drum 405 rotates at a predetermined speed during a printing operation. When the gripper 406 on the transfer drum 405 is moved to a position of the leading edge of the paper by the rotation of the transfer drum 405, the gripper 406 grips the leading edge of the paper. According to this grip and a rotation of the print paper conveyance roller 407, the paper 401 is wound around the transfer drum 405 and conveyed further to next process.

A photosensitive drum 408, a developer supporting member 409, a yellow (Y) toner developer 410, a magenta (M) toner developer 411, a cyan (C) toner developer 412, and a black (BK) toner developer 413 are included in the laser beam printer. The developer supporting member 409 rotates to convey the toner developer of a desired color to a position of the photosensitive drum 408 where development is performed.

A laser scanner unit 414 turns on and off a semiconductor laser (not shown) according to dot data which is sent from a print control unit (controller) 415. As a result, the semiconductor laser scans the photosensitive drum 408 in the main scanning direction and forms a latent image on the main scanning line. The controller 415 controls the entire image forming apparatus. Further, the controller 415 functions as the above-described scanning line shape measurement unit 304, the image data converting unit 305, the scanning line reference position adjusting unit 306, the scanning line dividing unit 307, and the color misregistration amount correcting unit 308.

The photosensitive drum 408 is rotated so that timing of the above-described formation of the latent image is in synchronization with timing at which the paper 401 is placed on the transfer drum 405. When a surface of the photosensitive drum 408 which is precharged by a charging unit (not shown) is exposed to the above-described laser beam, a latent image for one page is formed on the photosensitive drum 408. This latent image on the photosensitive drum 408 is developed as a toner image by the toner developer of a predetermined color from among the yellow toner developer 410, the magenta toner developer 411, the cyan toner developer 412, and the black toner developer 413. After then, the developed toner image is transferred onto the paper 401 on the transfer drum 405.

A similar operation is performed for a number of times depending on a number of colors that is necessary, and the toner image is superimposed on the paper 401 on the transfer drum 405. After the necessary toner image is transferred onto the paper 401, the paper 401 is separated from the transfer drum 405 by a transfer separation claw 416. Then, heat and pressure is applied to the paper 401 by a pair of fixing rollers 417 and 417' to fix the toner image onto the paper. The paper 401 with the fixed toner image is conveyed by conveyance rollers 418, 418', and 419 and then discharged on a discharge tray 420.

Figure 1:
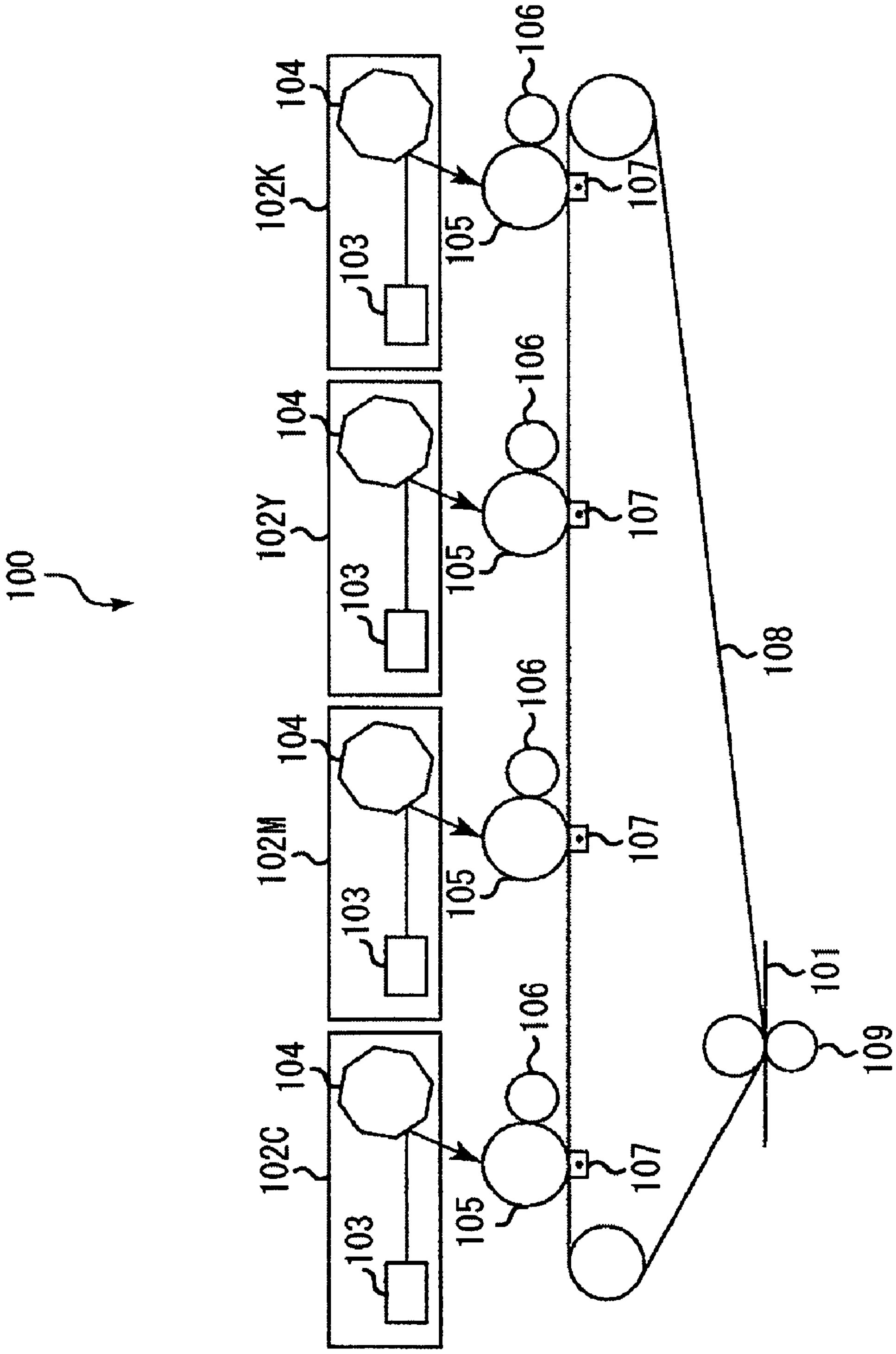
FIG. 1 (PRIOR ART)
FIG. 1 illustrates a schematic configuration of a tandem-type laser beam printer to which the present invention can be applied.

A density sensor 423 detects density of a patch image, namely each toner image of CMYK which is formed on the photosensitive drum 408 at predetermined timing. Although the above-described configuration is described based on a printer including a single drum, a configuration of an image forming unit (i.e., the photosensitive drum, the laser, the polygonal mirror, and the rollers) of the laser beam printer in the present exemplary embodiment and a second and a third exemplary embodiments is the same as illustrated in FIG. 1. More specifically, four laser scanner units 414 corresponding to each of the CMYK colors are included in the laser beam printer according to the first, the second, and the third exemplary embodiments. Similarly, four photosensitive drums 408 and polygonal mirrors are provided. Further, a cartridge-type toner is installed in the image forming apparatus.

Next, details of operations of the entire system according to the present exemplary embodiment will be described referring to FIG. 5.

Figure 5:
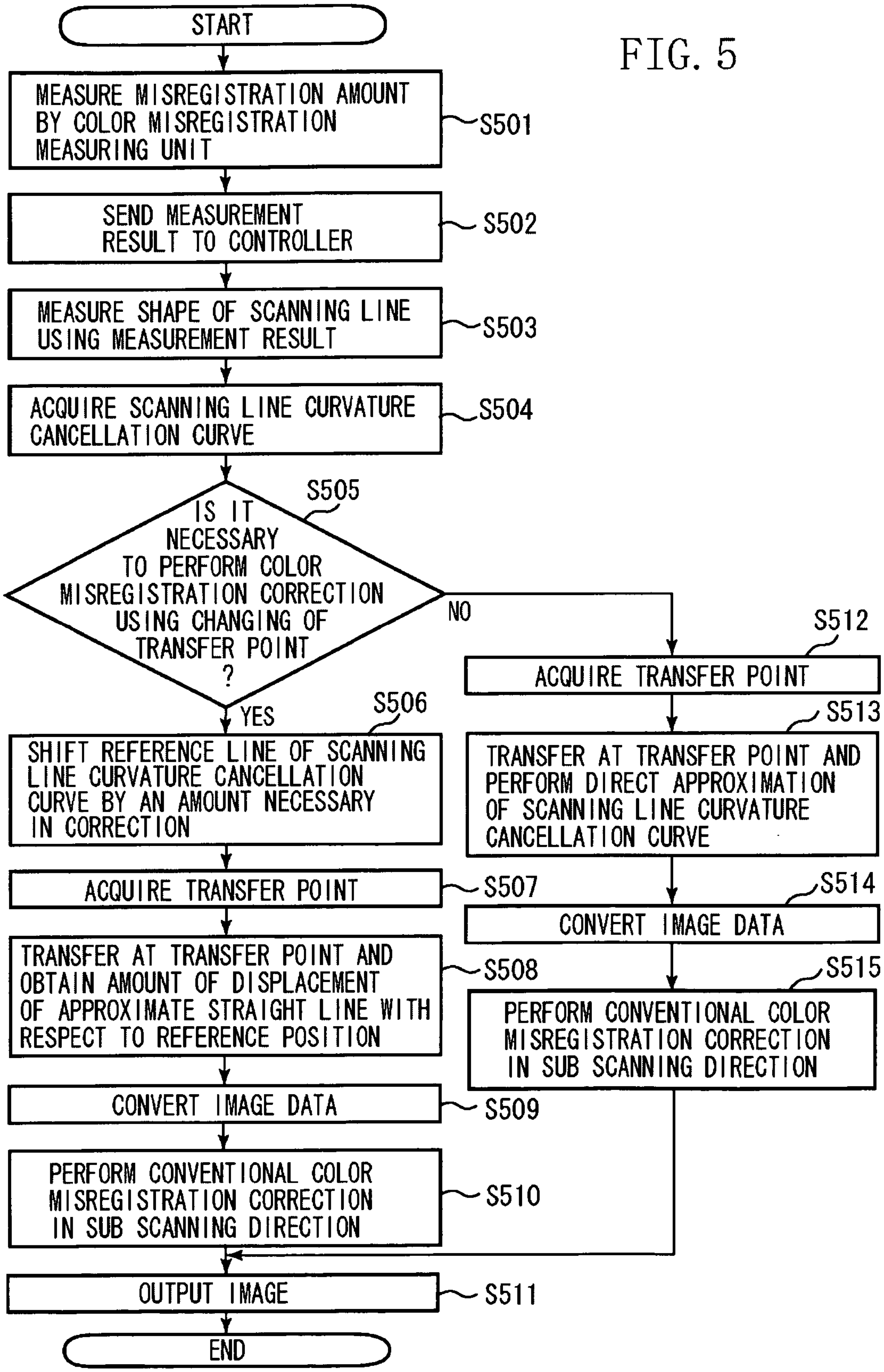
FIG. 5 is a flowchart illustrating a flow of correction processes of an amount of color misregistration in the sub scanning direction according to an exemplary embodiment of the present invention.

FIG. 5 is a flowchart illustrating the operation of the entire system according to the present exemplary embodiment illustrated in FIG. 3.

First, in step S501, the color misregistration amount measuring unit 302 illustrated in FIG. 3 measures the above-described amount of misregistration. The measurement is performed when the user requests measurement and correction of the amount of misregistration, or when conditions for automatically measuring and correcting the amount of misregistration are satisfied, such as when the toner cartridge is replaced. The user can request the measurement and the correction of the amount of misregistration via the host computer 310 or via the command input unit 311 included in the printer 300 illustrated in FIG. 3. The amount of misregistration includes at least amounts of color misregistration between two colors in the main scanning direction and the sub scanning direction respectively and an amount of misregistration (i.e., amount of curvature) of the scanning line of each color from its ideal position.

Figure 6:
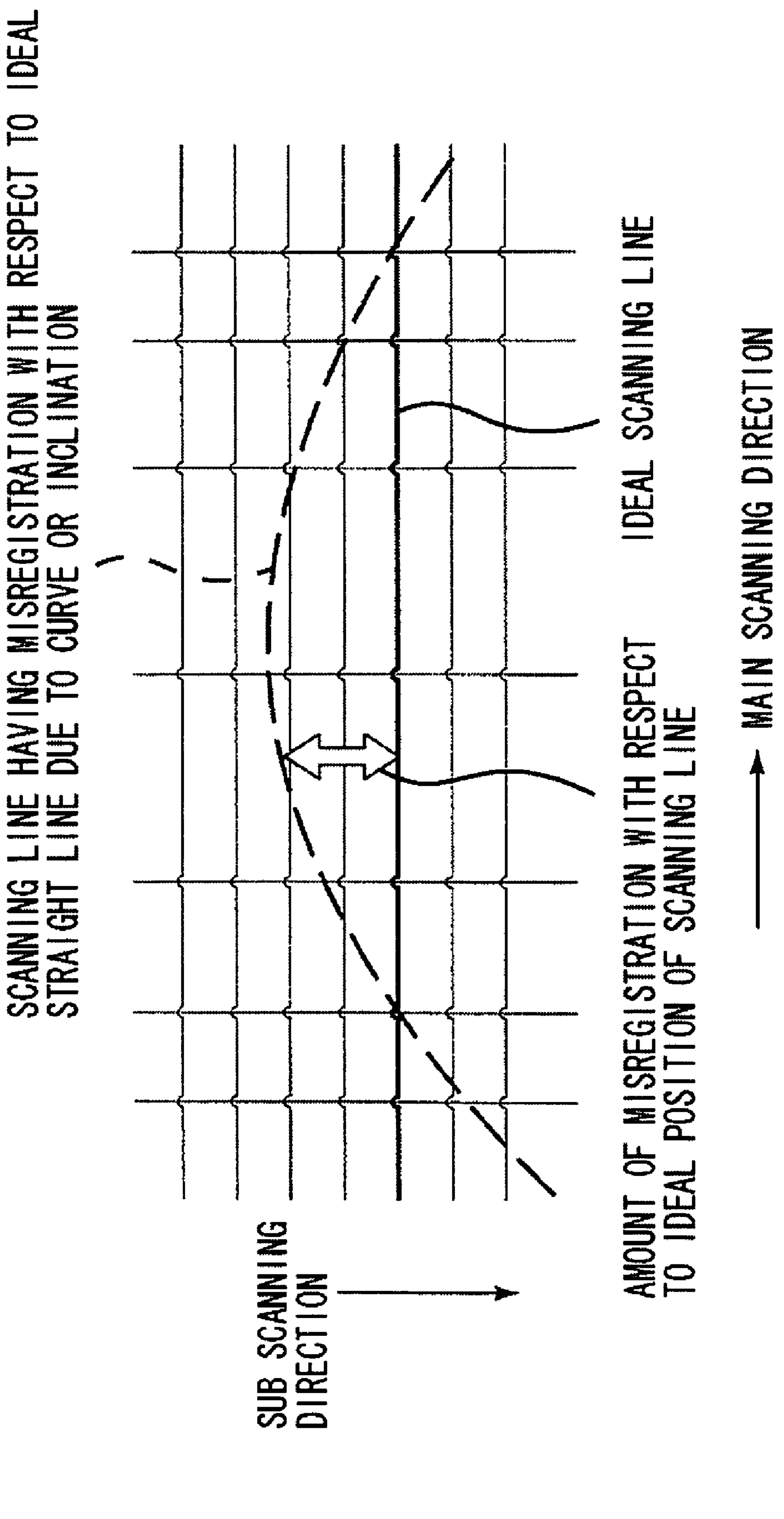
FIG. 6 illustrates a scanning line which is in a misregistration position with respect to an ideal position.

As described above, such misregistration occurs due to an optical curvature of the laser scanner unit 414 illustrated in FIG. 4 and other environmental factors when the photosensitive drum 408 is scanned by the laser beam which is emitted from the laser scanner unit 414 in the main scanning direction and the latent image is formed on the main scanning line. FIG. 6 illustrates a scanning line of each color in a misregistration position from the ideal position. As a method for measuring the misregistration, for example, a patch of a specific pattern is formed on the photosensitive drum 408, and then a level of misregistration and curvature of the pattern is measured by comparing with the ideal position. Various methods can be applied so long as the amount of misregistration between two colors and the amount of misregistration of the scanning line of each color from its ideal position can be accurately measured.

In step S502, the color misregistration amount measuring unit 302 sends the measurement result of the amount of misregistration of each color to the controller 415.

In step S503, the controller 415 which received the measurement result of the amount of misregistration of each color stores the measurement result in the data recording unit 303 and then measures (calculates) a shape of each scanning line based on the amount of misregistration stored in the data recording unit 303. Each scanning line is curved, in stead of an ideal straight line, due to a unique curve of the laser scanner unit 414 illustrated in FIG. 4 and an inclination of a belt which are included in the print processing executing unit 309 illustrated in FIG. 3. The shape of the scanning line that is curved can be calculated by obtaining an amount of misregistration at three or more pixels on the scanning line from the ideal position of the scanning line. Since the ideal scanning line is a straight line, the amount of misregistration can be considered as a distance between the curved scanning line and the straight line. If the amount of misregistration at each of the three pixels on the scanning line from the ideal position on the scanning line is obtained, a schematic shape of the scanning line can be obtained by connecting the three points. Further, from coordinates of the three points, an equation expressing a curved line or a straight line of the scanning line can be obtained.

Figures 7A, 7B:
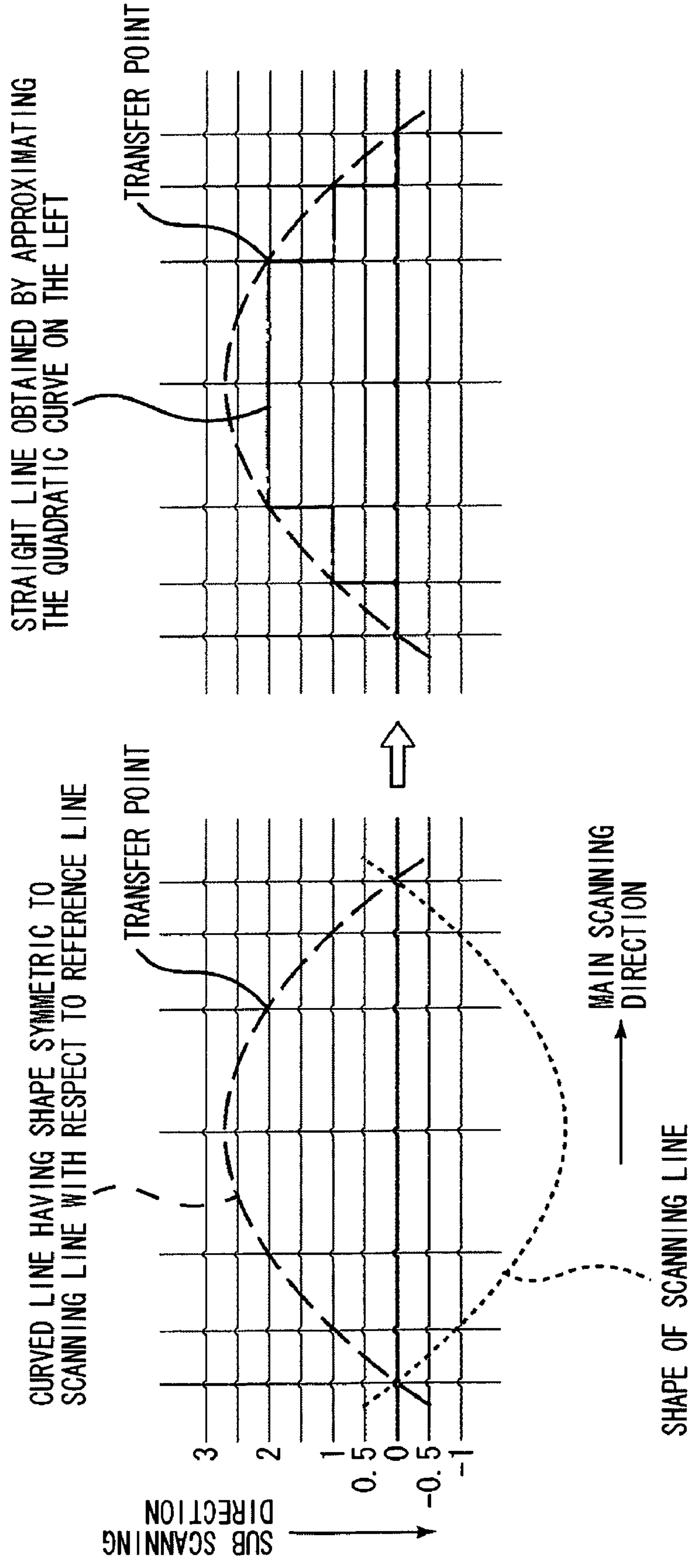
FIGS. 7A and 7B illustrate transfer processing according to an exemplary embodiment of the present invention.

If the scanning line is determined as a curved line as is a dotted line in FIG. 7A as a result of the calculation, then in step S504, a curved line (a dashed line in FIG. 7A) that is line symmetric with the ideal scanning is obtained. According to this process, a scanning line curvature cancellation curve is determined. If printing is performed as if the scanning is performed along a locus that is same as the scanning line curvature cancellation curve, the amount of misregistration such as the curve and the inclination will be cancelled. Accordingly, an intended straight line can be formed. Thus, the whole image data is converted to follow the shape of the scanning line curvature cancellation curve.

However, since the scanning by the laser beam emitted from the laser scanner unit 414 is performed line by line, the shape of the scanning line curvature cancellation curve can not be reflected to the conversion as it is. Thus, the curve is expressed by moving up or down the image data that originally exists on the same scanning line in a bitmapped state for one line in the sub scanning direction with certain points. A result obtained by performing this approximation to the dashed line in FIG. 7A is a dashed-dotted line in FIG. 7B. Here, moving the certain points in the image data that exist collinearly in a bitmapped state up or down in the sub scanning direction for one line is called “transferring” and a point to which the “transferring” is applied is called a “transfer point”. As a method for moving a certain point up or down for one line in the sub scanning direction, first, for example, neighboring image data in the sub scanning direction is stored in a line memory of a plurality of lines. Next, image data necessary in forming an image is read out from the line memory. At this time, by reading out image data that is one line down in the sub scanning direction compared to the image data which is currently being read out from the line memory. Similarly, by reading out image data that is one line up in the sub scanning direction compared to the image data of the line which is currently read out from the line memory, the image can be moved one line down in the sub scanning direction.

By this transfer processing, the shape of the scanning line curvature cancellation curve can be substantially reflected (approximated) to the image data. According to the scanning line curvature cancellation curve in FIG. 7B, if a value of the curve in the sub scanning direction (hereinafter, a value of y coordinate, which is in units of line) is, for example, 0 or more, and less than 1, then the value is approximated to 0. If the value of y coordinate is 1 or more, and less than 2, then the value is approximated to 1. That is, in FIG. 7B, points of y=1 and y=2 on the scanning line curvature cancellation curve are used as the transfer points.

The transfer point (namely a point at which a straight line is divided and moved up or down for one line in the sub scanning direction) is not unique. Thus, a different approximation can be performed by setting a different transfer point. By changing the transfer point, the position of the image data to be printed can also be changed. How to change the print output position by using a changed transfer point will be described below referring to FIGS. 8A through 8D.

Figures 8A, 8B, 8C, 8D:
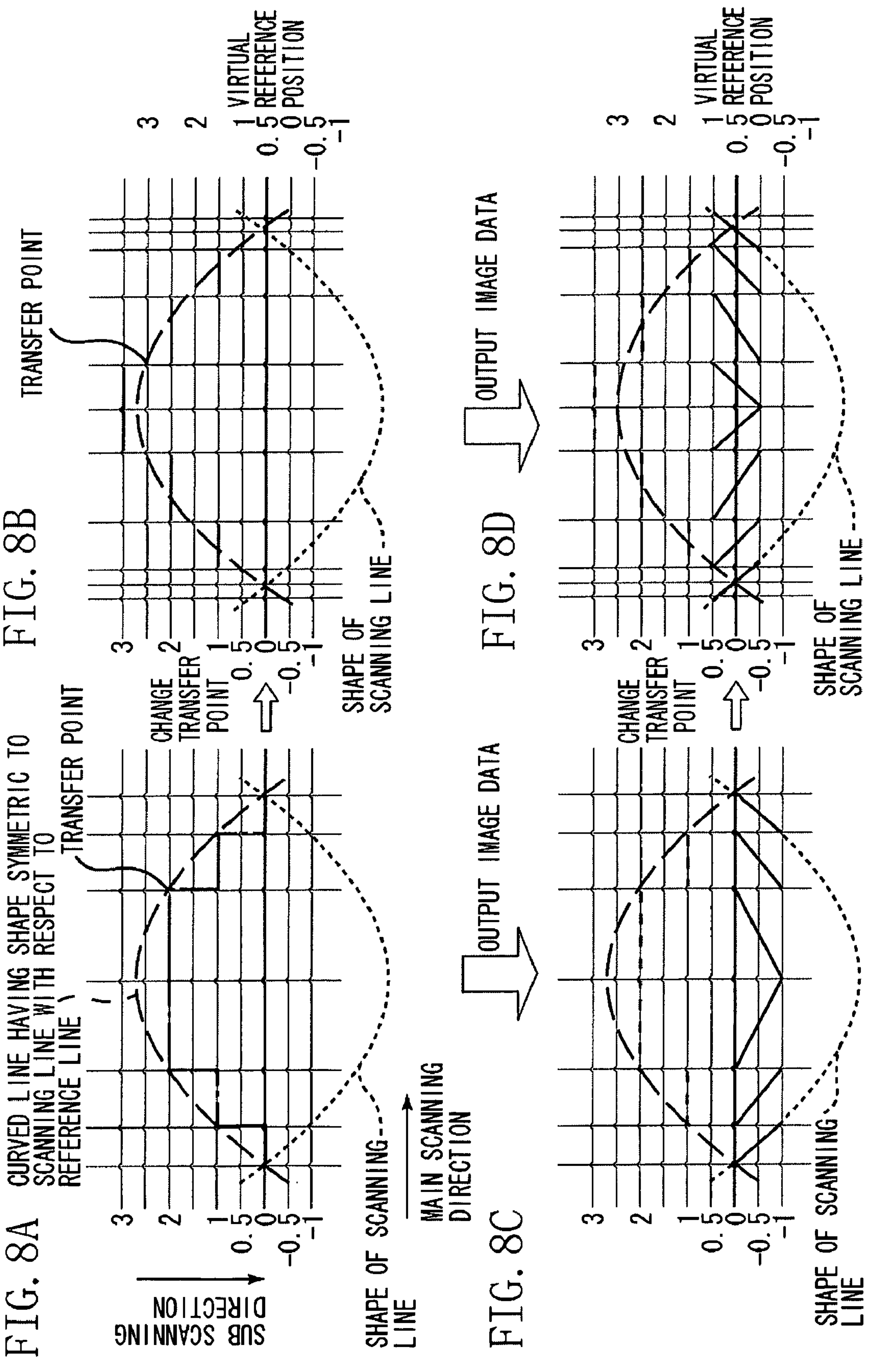
FIGS. 8A through 8D illustrate an example of color misregistration amount correction in units smaller than a main scanning line interval in the sub scanning direction by changing a transfer point according to an exemplary embodiment of the present invention.

The dashed-dotted line in FIG. 8A is obtained by a straight line approximation of the scanning line curvature cancellation curve using the transfer points that are same as those of the dashed-dotted line in FIG. 7B. If a result of the straight line approximation (image data) such as the dashed-dotted line in FIG. 8A is printed, the solid lines in FIG. 8C will be printed. The solid lines in FIG. 8C are obtained since the image data at the position of y=0 in FIG. 8C is affected by the curve of the laser scanner unit 414 when it is printed. It is understood from FIG. 8C that the output result of the printing or, in other words, the solid lines in FIG. 8C are drawn within a range of the main scanning line interval with the coordinate of y=−0.5 in the middle. This would appear to human eyes as a straight line drawn at the y=−0.5 coordinate. However, the straight line is desirable to be drawn at a coordinate of y=0.

Thus, if the straight line approximation of the scanning line curvature cancellation curve is performed by changing the transfer points, the result will be as illustrated in FIG. 8B. An output result of a group of solid lines (image data) in FIG. 8B is the group of solid lines in FIG. 8D. It is understood from FIG. 8D that the output result of the printing or, in other words, the solid lines in FIG. 8D are drawn within the range of the main scanning line interval with the coordinate of y=0 in the middle. In other words, by changing the transfer points for performing the straight line approximation of the scanning line curvature cancellation curve, the output of the print position in the sub scanning direction can be changed. More specifically, the print position in the sub scanning direction can be corrected by changing the positions of the transfer points. A determination method of the transfer points will be described below.

A coordinate on a position of y=0 in FIG. 8A is referred to as an "original coordinate". A coordinate (illustrated on the right side of FIGS. 8B and 8D) that is moved −0.5 in the y direction with respect to the original coordinate is referred to as a "virtual coordinate".

Further, an amount of movement from the original coordinate to the virtual coordinate is referred to as an "amount of movement of a coordinate", then the amount of movement of the coordinate in FIGS. 8B and 8D can be referred to as "−0.5 in the y direction". In this example, the amount of movement of the coordinate in FIGS. 8B and 8D is set since the misregistration of the print position in FIG. 8C is "−0.5 in the y direction" with respect to the expected position. However, the amount of movement may be set based on a measurement result of the amount of misregistration of each color which is measured by the color misregistration amount measuring unit 302.

At this time, a method similar to the determination method of the transfer points applied to the original coordinate in FIG. 8A, namely a method that sets the points of y=1, 2, and 3 on the scanning line curvature cancellation curve as the transfer points is applied to the virtual coordinate. More specifically, points where the scanning line curvature cancellation curve is divided for each interval of the main scanning line are set as the transfer points by setting a virtual reference position as a reference position. Then, as illustrated in FIG. 8B, points of y=1, 2, and 3 on the scanning line curvature cancellation curve in the virtual coordinate, which are the points of y=0.5, 1.5, and 2.5 in the original coordinate, will be the transfer points. If the image data which is transferred at the transfer points is printed, the print result is moved 0.5 line up (a half of the main scanning line interval) in the sub scanning direction.

The above described determination method of the transfer point is an example and therefore another method can be employed so long as a similar transfer point can be determined.

As described above, the print position in the sub scanning direction can be changed by changing the transfer point. In other words, the misregistration of the main scanning line from the ideal position in the sub scanning direction can be corrected by changing the transfer point and performing the transfer processing.

The color misregistration correction by changing the transfer point can correct the color misregistration which is smaller than the main scanning line interval (1 pixel of the main scanning) as described above.

Thus, if an amount of misregistration of a scanning line of a certain color measured by the color misregistration amount measuring unit 302 in step S501 in FIG. 5 is 1.5 line in the sub scanning direction, the color misregistration is corrected by changing the transfer point. In this case, the amount of color misregistration of 0.5 line which is unable to be corrected by the color misregistration correction method illustrated in line FIG. 2 can also be corrected.

On the other hand, if the amount of misregistration of the scanning line of the certain color measured in step S501 in FIG. 5 does not include a value smaller than the main scanning line interval, it is not necessary to perform the color misregistration correction by changing the transfer point at the time of transfer. Thus, in step S505, before performing the straight line approximation of the scanning line curvature cancellation curve by transferring the transfer points, the controller 415 determines whether it is necessary to perform the color misregistration correction by changing the transfer points at the time of transfer.

If the controller 415 determines that the color misregistration correction by changing the transfer points at the time of transfer is necessary, namely the color misregistration correction for correcting the amount of misregistration smaller than the main scanning line interval is necessary (YES in step S505), then the process proceeds to step S506. In step S506, the controller 415 acquires the amount of movement of the above-described coordinate and sets the virtual coordinate. The amount of movement of the coordinate that is used in step S506 is a value smaller than the main scanning line interval included in the amounts of misregistration of the main scanning line from the reference position measured in step S501.

In step S507, the controller 415 determines the transfer points using the virtual coordinate. The transfer points are determined as described above.

In step S508, the controller 415 transfers the image data at the transfer points determined in step S507, performs the straight line approximation of the scanning line curvature cancellation curve, and obtains the amount of displacement of each approximate straight line from the reference position. In step S509, the controller 415 converts the image data so that the image data corresponds to the approximate straight line. More specifically, the controller 415 moves a stored position of the image data in the memory space in the direction corresponding to the sub scanning direction, by an amount of displacement from the reference position with respect to each range of a plurality of straight lines (line segment) that approximate the scanning line curvature cancellation curve, at each position in the main scanning direction.

Figure 2:
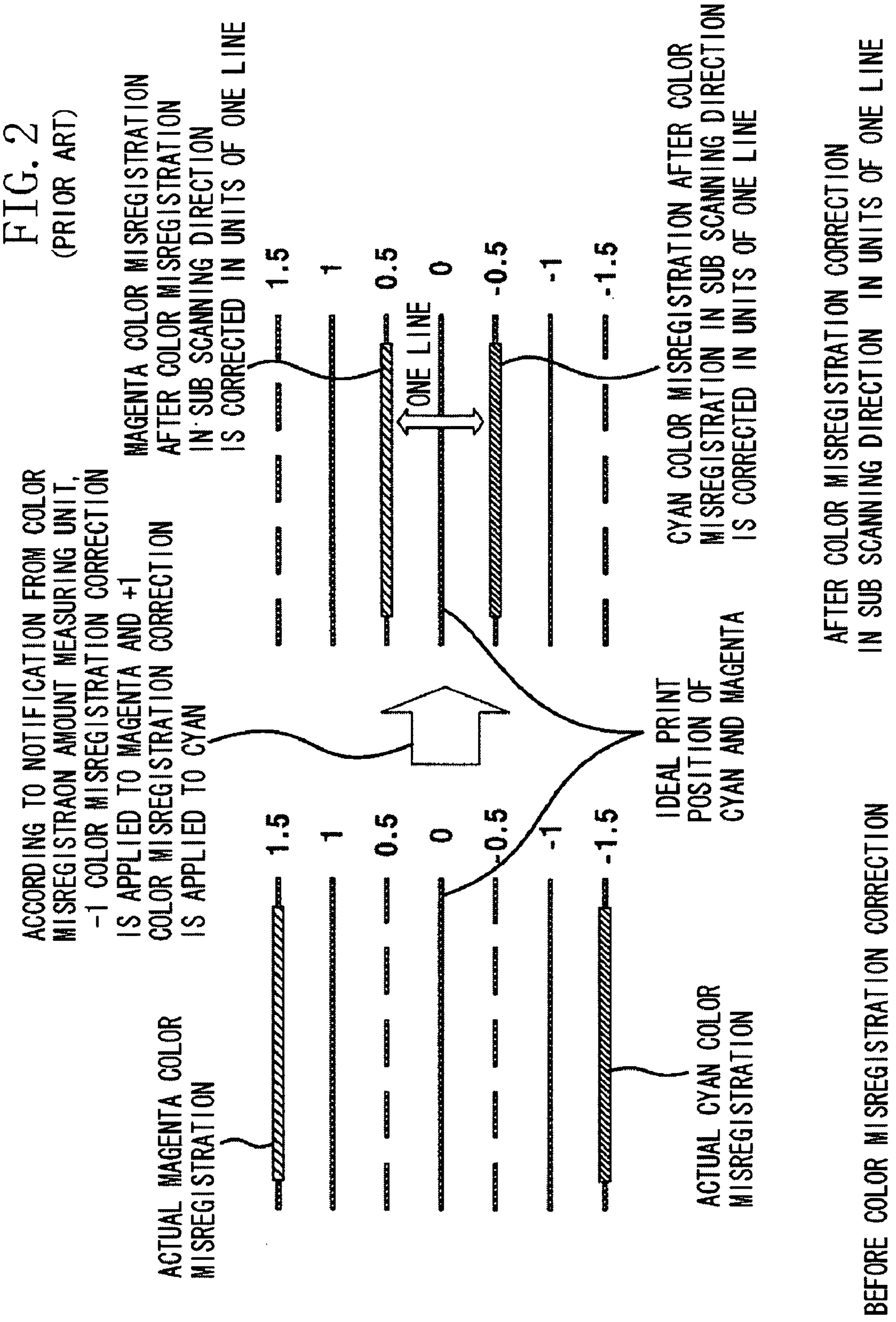
FIG. 2 (PRIOR ART)
FIG. 2 illustrates a phenomenon where color misregistration of one line occurs between two monochromatic images in the sub scanning direction.

In step S510, the controller 415 performs the color misregistration correction line by line in the sub scanning direction using the color misregistration correction method illustrated in FIG. 2.

In step S511, the controller 415 outputs the image having the corrected color misregistration. According to the above-described processes, an image with reduced color misregistration can be printed by performing the color misregistration correction in the sub scanning direction in units smaller than the main scanning line interval (smaller than one line).

Further, in step S505, if the controller 415 determines that the color misregistration correction by changing the transfer point at the time of transfer is not necessary (NO in step S505), then the controller 415 proceeds to steps S512. Processes in steps S512 through S515 are similar to those of steps S507 through S510.

A second exemplary embodiment of the present invention is a case where all units that are necessary for realizing the present invention are not included in one image forming apparatus, such as when the present invention is applied to a host-based printer. With respect to the host-based printer, the host computer (PC) generates the image data and performs the color misregistration correction.

Thus, in step S502 in FIG. 5, the host computer as well as the controller in the printer need to be notified of the amount of misregistration of each color measured by the color misregistration amount measuring unit 302 in step S501 in FIG. 5. The amount of misregistration of each color is sent to the host computer via a communication unit such as a network. The host computer that receives the amount of misregistration of each color performs the image data conversion and the color misregistration correction in units smaller than the main scanning line interval in the sub scanning direction according to the transfer processes in steps S503 through S509 in FIG. 5 by a method similar to the one described in the first exemplary embodiment.

The image data converted on the host computer side is sent to the controller of the printer. The controller performs the color misregistration correction in the sub scanning direction for each line. After the correction, the image is output and printed. Then an effect similar to the case where all the units for realizing the present invention are included in one image forming apparatus can be obtained.

According to the first and the second exemplary embodiments, in order to electrically correct the curvature of the scanning line, the image data is converted to cancel the curvature of the scanning line at the time the laser beam is emitted. However, there is a method for changing a position to read the image data to cancel the curvature of the scanning line without converting the image data.

This method also requires approximation of the scanning line curvature cancellation curve by a plurality of straight lines. At that time, a point to be moved one line up or down from the currently-read line also exists. By changing a position of the point, the color misregistration correction in units smaller than the main scanning line interval in the sub scanning direction can be performed similar to the first and the second exemplary embodiments.

If the color misregistration correction in units smaller than the main scanning line interval in the sub scanning direction can be performed, the color misregistration can be reduced than before and change in tint can be reduced.

According to the exemplary embodiments above, the shape of a plurality of curved light beams for exposure is measured, and the scanning line curvature cancellation curve that has a curve and an inclination that can cancel a curve and an inclination of the measured shape is acquired to correct the color misregistration.

Further, by adjusting division positions that are the end points of the plurality of straight lines that approximate the scanning line curvature cancellation curve (the above-described transfer points), the amount of misregistration of each color in the sub scanning direction can be corrected in units smaller than the main scanning line interval.

The above-described exemplary embodiments can be applied to, for example, a system including a plurality of devices such as a computer (an information processing apparatus), an interface device, a reader, and a printer. The above-described exemplary embodiments can also be applied to an apparatus including a single device such as a multifunction peripheral, a printer, or a fax machine.

The present invention can be achieved by reading out a program code for realizing processes described in the flowcharts in the above-described exemplary embodiments stored in a computer-readable storage medium and executing by a system or a computer (or central processing unit (CPU) and micro processing unit (MPU)) of an apparatus. In this case, the program code read out from the computer-readable storage medium itself realizes the functions of the above-described exemplary embodiments. Thus, the program code and the computer-readable storage medium which stores and records the program code also constitute the exemplary embodiment of the present invention.

A computer-readable storage medium for storing the program code includes a floppy disk, a hard disk, an optical disk, a magneto-optical disk, a compact disc read-only memory (CD-ROM), a compact disc-recordable (CD-R), a magnetic tape, a non-volatile memory card, and a ROM.

The functions of the above-described exemplary embodiments can be implemented when the provided program is executed by a computer. Additionally, an operating system (OS) running on the computer can realize the functions of the above-described exemplary embodiments by performing the entire or a part of the actual processing based on an instruction from the program.

Further, the functions of the above-described exemplary embodiments are also realized by a function expansion board inserted in a computer or a function expansion unit connected to a computer. In this case, the program read out from the computer-readable storage medium is written in a memory in the function expansion board inserted in the computer or the function expansion unit connected to the computer and a CPU provided in the function expansion board or the function expansion unit performs the entire or a part of the actual processing based on an instruction from the program. Thus, the functions of the above-described exemplary embodiments are also realized by the processing of the function expansion board or the function expansion unit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-032270 filed Feb. 13, 2008, which is hereby incorporated by reference herein in its entirety.

What is claimed is:

1. An image forming apparatus comprising:

a data recording unit configured to store an amount of misregistration of a scanning line with respect to an ideal scanning line when a plurality of laser beams is scanned in a main scanning direction;

a calculation unit configured to calculate a shape of the scanning line when the plurality of laser beams is scanned in the main scanning direction based on the amount of misregistration stored in the data recording unit, and to determine a scanning line curvature cancellation curve which cancels misregistration of the calculated shape of the scanning line; and an image forming unit configured to form an image that reflects the scanning line curvature cancellation curve by shifting image data which is read out from a memory unit in a sub scanning direction according to the scanning line curvature cancellation curve determined by the calculation unit, wherein the image forming unit corrects the amount of misregistration which is smaller than a main scanning line interval by adjusting a transfer point at which the image data is shifted in the sub scanning direction, the transfer point is a position at which the scanning line curvature cancellation curve is divided for each main scanning line interval at a reference position which is an ideal scanning position, and wherein the image forming unit sets the reference position at a position that cancels the amount of misregistration smaller than the main scanning line interval if the amount of misregistration includes an amount of misregistration smaller than the main scanning line interval, and does not change the reference position if the amount of misregistration does not include an amount of misregistration smaller than the main scanning line interval.

2. The image forming apparatus according to claim 1, further comprising a measurement unit configured to measure the amount of misregistration, wherein the measurement unit measures the amount of misregistration in units smaller than the main scanning line interval.

3. An information processing apparatus comprising:

a data recording unit configured to store an amount of misregistration of a scanning line with respect to an ideal scanning line when a plurality of laser beams is scanned in a main scanning direction in a printer;

a calculation unit configured to calculate a shape of the scanning line when the plurality of laser beams is scanned in the main scanning direction based on the amount of misregistration stored in the data recording unit, and to determine a scanning line curvature cancellation curve which cancels misregistration of the calculated shape of the scanning line; and an image processing unit configured to obtain an image that reflects the scanning line curvature cancellation curve by shifting image data which is read out from a memory unit in a sub scanning direction according to the scanning line curvature cancellation curve determined by the calculation unit, wherein the image processing unit corrects the amount of misregistration which is smaller than a main scanning line interval by adjusting a transfer point at which the image data is shifted in the sub scanning direction, the transfer point is a position at which the scanning line curvature cancellation curve is divided for each main scanning line interval at a reference position which is an ideal scanning position, and wherein the image processing unit sets the reference position at a position that cancels the amount of misregistration smaller than the main scanning line interval if the amount of misregistration includes an amount of misregistration smaller than the main scanning line interval, and does not change the reference position if the amount of misregistration does not include an amount of misregistration smaller than the main scanning line interval.

4. A method for processing an image comprising:

storing an amount of misregistration of a scanning line with respect to an ideal scanning line in a data recording unit when a plurality of laser beams is scanned in a main scanning direction in a printer;

calculating a shape of the scanning line when the plurality of laser beams is scanned in the main scanning direction based on the amount of misregistration stored in the data recording unit, and determining a scanning line curvature cancellation curve which cancels misregistration of the calculated shape of the scanning line;

obtaining an image that reflects the scanning line curvature cancellation curve by shifting image data which is read out from a memory unit in a sub scanning direction according to the scanning line curvature cancellation curve; and correcting the amount of misregistration which is smaller than a main scanning line interval by adjusting a transfer point at which the image data is shifted in the sub scanning direction, the transfer point is a position at which the scanning line curvature cancellation curve is divided for each main scanning line interval at a reference position which is an ideal scanning position, and wherein the reference position is set at a position that cancels the amount of misregistration smaller than the main scanning line interval if the amount of misregistration includes an amount of misregistration smaller than the main scanning line interval, and the reference position is not changed if the amount of misregistration does not include an amount of misregistration smaller than the main scanning line interval.

5. A computer-readable storage medium storing a program for causing a computer to execute a method for processing an image, the method comprising:

storing an amount of misregistration of a scanning line with respect to an ideal scanning line in a data recording unit when a plurality of laser beams is scanned in a main scanning direction in a printer;

calculating a shape of the scanning line when the plurality of laser beams is scanned in the main scanning direction based on the amount of misregistration stored in the data recording unit, and determining a scanning line curvature cancellation curve which cancels misregistration of the calculated shape of the scanning line;

obtaining an image that reflects the scanning line curvature cancellation curve by shifting image data which is read out from a memory unit in a sub scanning direction according to the scanning line curvature cancellation curve; and correcting the amount of misregistration which is smaller than a main scanning line interval by adjusting a transfer point at which the image data is shifted in the sub scanning direction, the transfer point is a position at which the scanning line curvature cancellation curve is divided for each main scanning line interval at a reference position which is an ideal scanning position, and wherein the reference position is set at a position that cancels the amount of misregistration smaller than the main scanning line interval if the amount of misregistration includes an amount of misregistration smaller than the main scanning line interval, and the reference position is not changed if the amount of misregistration does not include an amount of misregistration smaller than the main scanning line interval.

* * * * *